United States Patent [11] 3,608,932

| [72] | Inventor | Cicero C. Brown<br>5429 Sturbridge Drive, Houston, Tex. 77027 |
|---|---|---|
| [21] | Appl. No. | 12,333 |
| [22] | Filed | Feb. 18, 1970 |
| [45] | Patented | Sept. 28, 1971 |

[54] POWERED COUPLING DEVICE
6 Claims, 5 Drawing Figs.

[52] U.S. Cl..................................................... 285/18,
166/0.6, 285/315, 285/351, 285/DIG. 13, 285/DIG. 21
[51] Int. Cl........................................................ F16l 35/00
[50] Field of Search............................................ 285/18,
315, 351, 24, 27, DIG. 21, DIG. 13, 321, 314;
166/0.6

[56] References Cited
UNITED STATES PATENTS

| 3,353,847 | 11/1967 | Brown............................ | 285/351 X |
| 3,361,453 | 7/1968 | Brown et al.................... | 285/351 X |
| 3,427,048 | 2/1969 | Brown............................ | 285/315 X |
| 3,445,126 | 5/1969 | Watkins......................... | 285/315 X |

Primary Examiner—Dave W. Arola
Attorney—R. Werlin

ABSTRACT: A powered coupling device for connecting massive tubular bodies, particularly at locations remote from the center of operations, as in connecting large diameter conduit or pipe to a subsea wellhead. The coupling device includes a pin member sealingly received in a box or socket member and power-driven latch elements for strongly securing the pin-and-box members together and to afford a metal-to-metal seal between the members to supplement a plastic seal between the members.

CICERO C. BROWN
INVENTOR.

PATENTED SEP28 1971

CICERO C. BROWN
INVENTOR.

BY

ATTORNEY

POWERED COUPLING DEVICE

This invention relates to coupling devices and more particularly to powered coupling devices adapted particularly for connections between massive tubular bodies especially at remote locations.

In the drilling and equipping of oil ans gas wells, particularly those being drilled through water bodies, it is frequently necessary to connect and disconnect pipe sections to and from each other and to and from various types of wellhead fittings located beneath the water surface, often at great depths.

In such marine drilling operations it is frequently necessary to connect wellhead structures to a submerged wellhead, such wellhead structures commonly comprising a rather massive assembly of fittings, valves, blowout preventers, and the like, which are ordinarily assembled in a so-called "stack" and installed as a composite unit on a suitable connection provided at the submerged wellhead.

Wherever possible it is desirable to avoid the use of divers in the subsea locations and to effect the connections mechanically by means operable from the surface. Because of the large diameters and massive nature of many of the structures and the connections involved, considerable power is required for making the necessary connections and to assure that the connections are sufficiently tight to withstand very great pressures which are frequently encountered.

My U.S. Pat. No. 3,427,048 discloses a form of powered coupling device suitable for the above-mentioned purposes. However, the invention there disclosed involved relatively complicated structures both in the drive elements and the latch elements, which were subject to numerous difficulties in operation which limited the usefulness of that invention for its intended purposes.

In accordance with the present invention, a powered coupling device is provided which is greatly simplified in its construction and operation as compared with the earlier patented design and thereby obviates many of the difficulties experienced with the earlier design.

The improved structure herein contemplated comprises a tubular box member and a tubular pin member slidably receivable in the box member to engagement in a metal-to-metal seal between the end of the pin member and a seat in the box member. A supplemental plastic seal is provided between the exterior of the pin member and the wall of the box member. The pin member is provided with an external annular latching groove for engagement with a set of rugged latching dogs mounted to the box member for radial movement into and out of the latching groove. A power-driven latching collar is threadedly connected to the box member and carries dog-engaging wedges which are actuated in response to rotation of the latching collar in one direction to drive the dogs into latching engagement in the groove on the pin member while also urging the end of the pin member into tight metal-to-metal seating in the box member. The dogs are released in response to reverse rotation of the latching collar.

Rotation of the latching collar is effected by power transmitted thereto from a plurality of fluid operated reversible motors suitably mounted about the box member and enclosed within a surrounding casing also secured to the box member. The transmission connection between the power units and the latching collar comprises pinions driven by the power units slidably meshing with a ring gear secured to the latching collar.

The various objects and advantages of this invention will become more readily apparent from the following detailed description when read in conjunction with the accompanying drawing which illustrates a useful embodiment in accordance with this invention.

Figure 2:
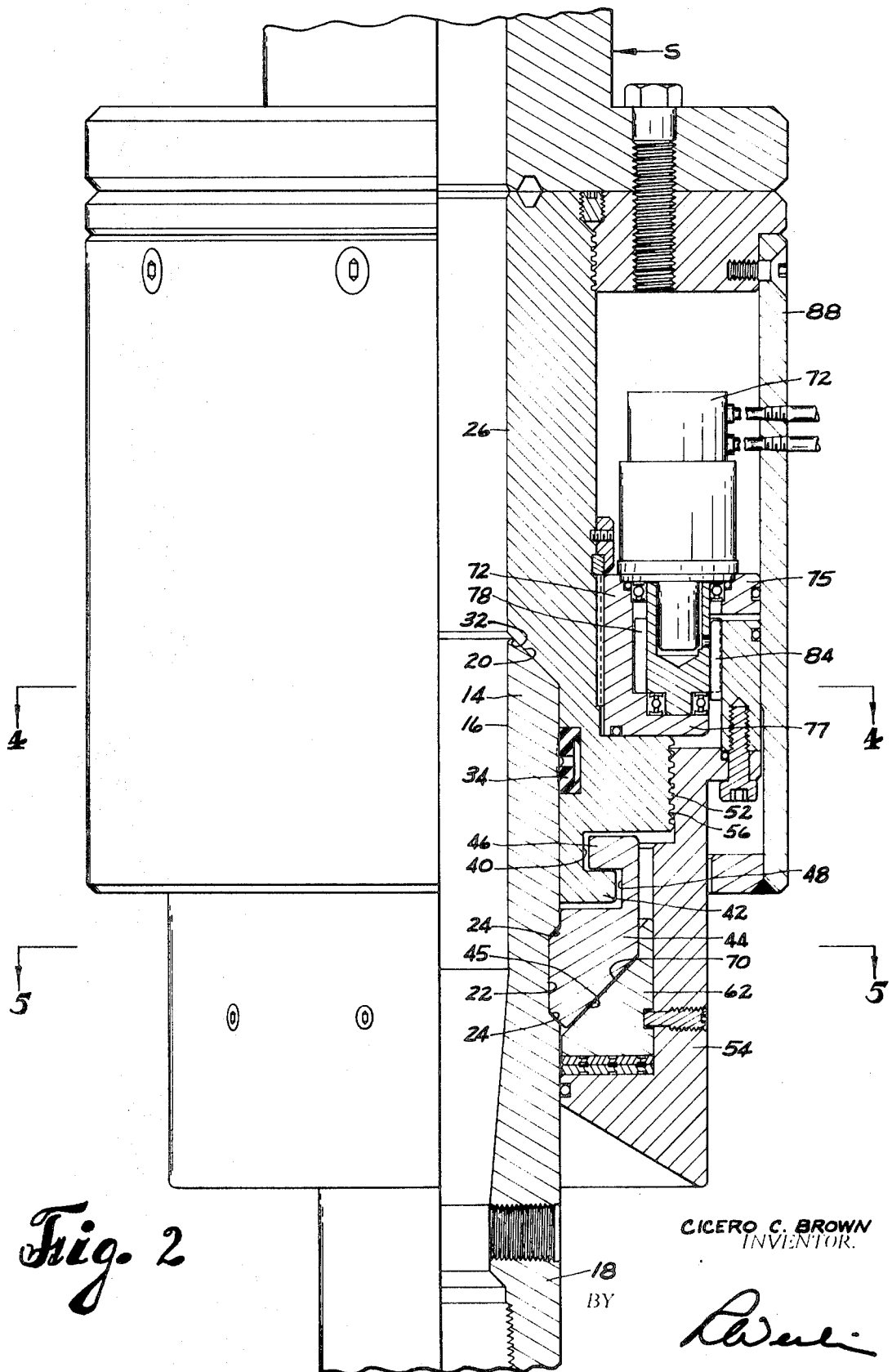
FIG. 2 is a view similar to FIG. 1 showing the parts in fully engaged and locked positions.
Figure 3:
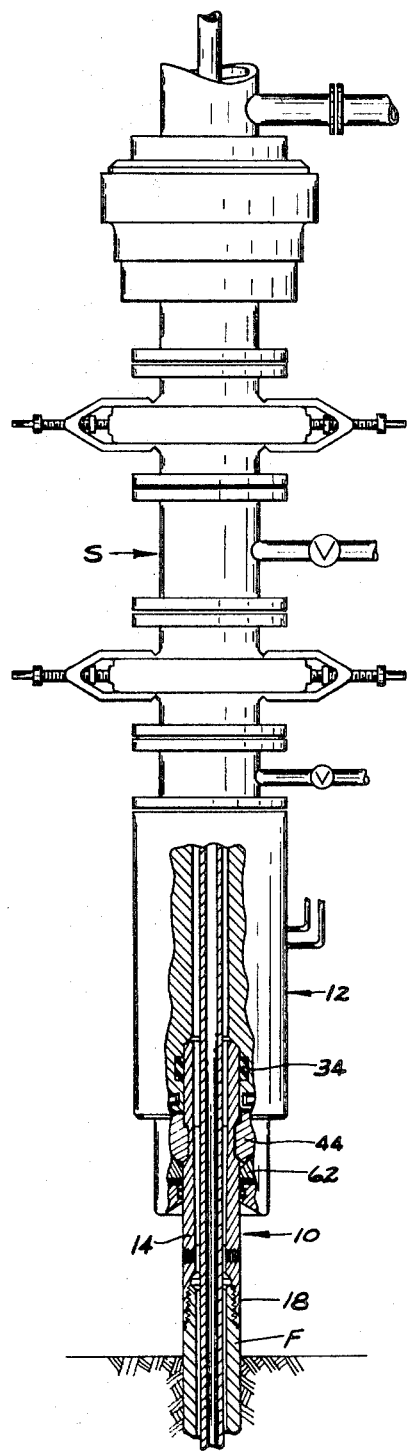
Figure 4:
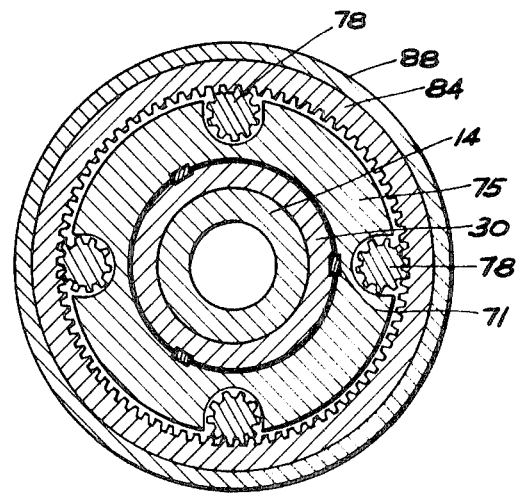
Figure 5:
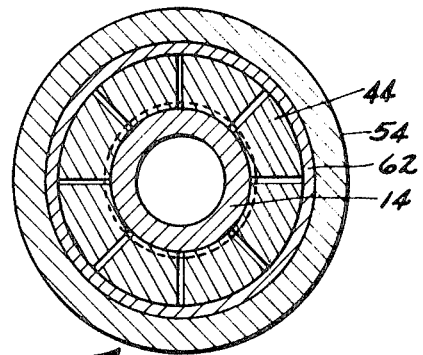

FIG. 3 is an elevational view, partly in section, showing a blowout preventer stack of wellhead fittings coupled to a wellhead by means of a coupling device in accordance with this invention; and FIGS. 4 and 5 are cross-sectional views taken respectively along lines 4—4 and 5—5 of FIG. 2.

Referring to the drawing, the coupling device comprises a male or pin member designated generally by the numeral 10, and a female or box member, designated generally by the numeral 12. Pin member 10 comprises a tubular stem 14 having an axial bore 16 and terminating at its lower end in an internally threaded socket 18 (FIG. 2) for threadedly receiving the threaded upper end of a conductor pipe or wellhead fitting F (FIG. 3) which may be a part of a subsea wellhead. Threaded socket 18 may be replaced by a bolt flange for coupling the same to a wellhead fitting, to which another fitting, such as a blowout preventer stack S is to be connected by the coupling device in accordance with this invention. The upper end of stem 14 of the pin member is provided with a bevelled end surface 20. The exterior of stem 14 is provided at a point spaced from end surface 20 with an annular latching groove 22 defined by bevelled end walls 24—24.

Box member 12 comprises a tubular body 26 having an axial bore 28. Bore 28 is counterbored from its lower end to provide a cylindrical socket 30 dimensioned to slidably receive stem 14 of the pin member and terminating at its inner end in a conically tapered seat 32 adapted for seating engagement by end surface 20 of the pin member when the coupling is made up. A deformable plastic seal ring 34 is seated in the wall of socket 30 for sealing engagement with the exterior of stem 14 when the latter is inserted in the socket. An annular bolt flange 36 is secured about the upper end of body 26 and forms means for connecting box member 12 to a mating flange M of preventer stack S by means of bolts 38.

The lower end of socket 30 is reduced in external diameter and is provided with an external annular recess 40 defining an outwardly projecting annular lip 42 about the lower end of the socket. A plurality of latching dogs 44 are mounted about the lower end of socket 30 for radial movement relative thereto, each of the dogs being formed to provide a hanger lip 46 receivable in recess 40 and an underlying notch or recess 48 to receive lip 42. The interlocking arrangement of lips 42 and 46 with the related recesses 40 and 48 permits a limited degree of radial movement between the dogs and the lower end of box member 12 sufficient to allow movement of the latching dogs into and out of engagement with latching groove 22 as will appear subsequently. The lower ends of dogs 44 are formed with conically tapered faces 45 to define wedges for purposes to be described hereinafter. The portion of body 26 immediately overlying recess 40 is radially enlarged to provide an annular flange 50, the external periphery of which is formed with a section of threads 52. A latching collar 54 is slidably disposed about stem 14 and is provided in its upper end with a section of internal threads 56 for engagement with threads 52. Collar 54 has an internal bore 58 extending below threads 56 and terminating in an upwardly facing end wall 60. A wedge or expander ring 62 is seated in bore 58 on end wall 60. Antifriction bearings 64 are disposed between end wall 60 and the lower end of ring 62. An annular groove 66 is provided in the outer periphery of ring 62 for receiving a plurality of keeper pins 68 threaded through the wall of collar 54, the pins serving to hold expander ring 62 in place on bearings 64 while permitting relative rotation between collar 54 and the expander ring. Expander ring 62 is provided on its upper end with a conically tapered face 70 generally complementary to faces 45 of the latching dogs and adapted to cooperate therewith to urge the dogs radially inwardly in response to upward movement of the expander ring relative to dogs and to release the latter upon relative retraction of the expander ring. Longitudinal movement of the expander ring relative to the latching dogs is effected by rotation of latching collar 54 through the connection between threads 52 and 56.

Latching collar 54 is rotated by powered means which include a plurality of pressure fluid-operated reversible motors 72 of any well-known design mounted on a horizontally disposed U-shaped bearing plate 74 having upper and lower spaced-apart arms 75 and 77, respectively, and which is seated on the upper end of enlargement 50. Bearing plate 74 is nonrotatably secured to box member 12 by means of splines 73, a lock ring 71 and a keeper ring 69. Each motor shaft 76 has mounted thereon a spur gear 78 journaled in bearings 80–82 suitably seated in the arms 75 and 77 of plate 74. An internally toothed ring gear 84 is secured by means of bolts 85 to an outwardly extending flange 86 formed on the upper end of collar 54. Ring gear 84 and spur gears 78 have parallel axes and the teeth of ring gear 84 which are in mesh with the teeth of the several spur gears 78 are arranged to slide longitudinally thereon to accommodate the longitudinal movement of collar 54 as it is screwed up and down over threads 52 in response to rotation of the collar by the motors acting through gears 78 and 84.

A tubular housing 88 encloses the motors and transmission elements being fastened at its upper end to flange 36 by means of bolts 90 and terminating at its lower end in an annular flange 92 projecting inwardly beneath collar flange 86 and surrounding collar 54. Conduits 94 and 96, respectively, extend through the wall of housing 88 into communication with each of the motors for supplying and exhausting pressure fluid as required during operation of the device.

Operation of the above-described device is as follows:

Pin member 10 will normally be secured in upwardly projecting position on the upper end of fitting F (FIG. 3). Box member 12 will have been secured to flange M on the lower end of stack S. The parts comprising the box member will be in the positions illustrated in FIG. 1. In this position latching collar 54 will be in its lowered or retracted position relative to latching dogs 44. The box member will then be lowered over pin member 10 which will enter socket 30 until, as seen in FIG. 2, end surface 20 engages seat 32 in metal-to-metal contact while plastic seal 34 seals about stem 14 of the pin member. Latching groove 22 will simultaneously be positioned in registration with dogs 44. Motors 72 will then be actuated to rotate latching collar 54 in a direction to cause it to move upwardly over threads 52 bringing expander ring 62 into wedging contact with bottom faces 45 of the latching dogs, thereby urging the latter into tight gripping engagement in groove 22 (FIG. 2). At the same time the upwardly directed force will be exerted through the dogs to stem 14 increasing the metal-to-metal sealing force exerted between end surface 20 and seat 32. The parts of the coupling will thus be tightly locked together in tight sealing engagement both through the metal-to-metal seal and the plastic seal.

Figure 1:
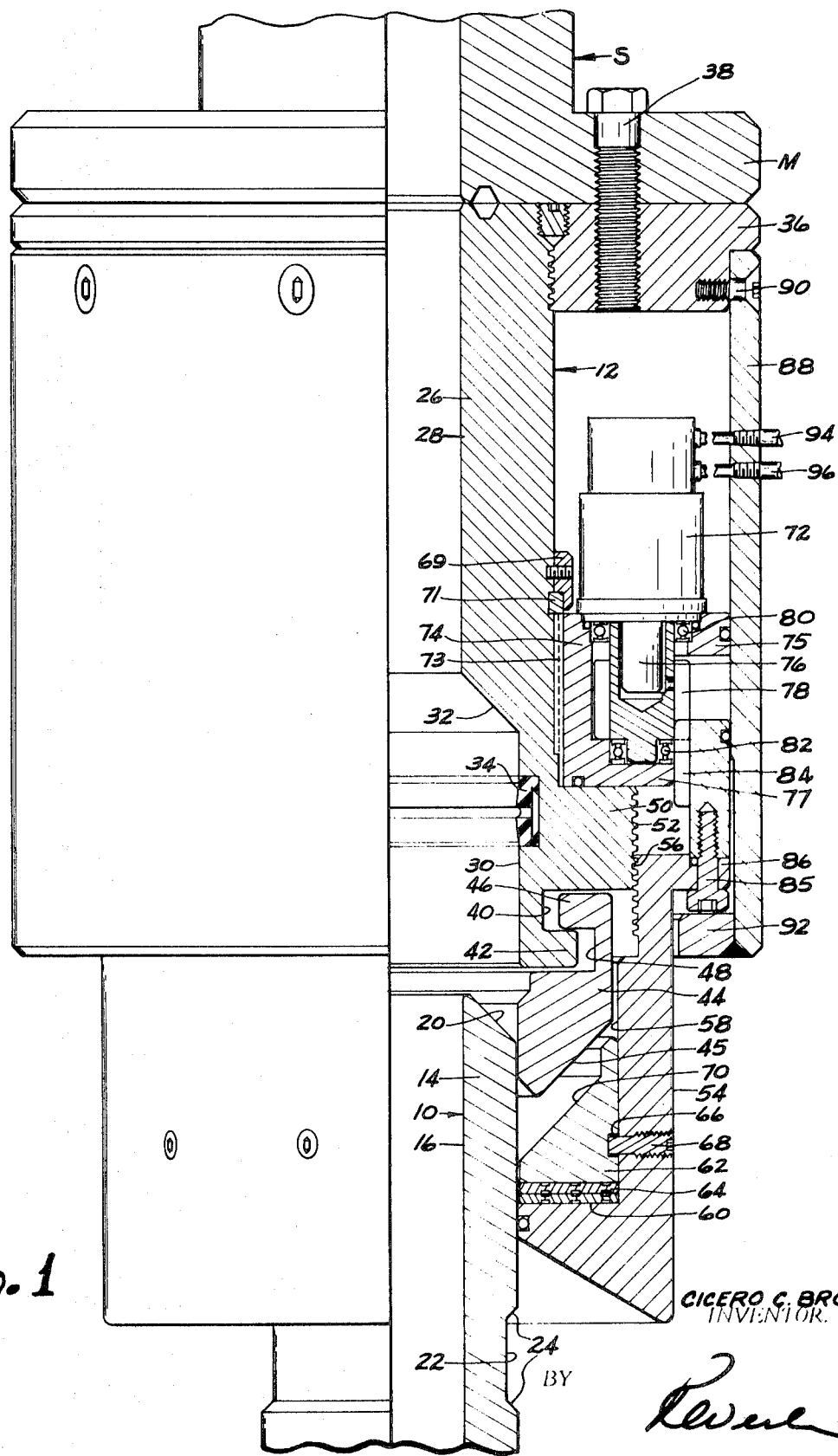
FIG. 1 is a longitudinal, quarter-sectional view of the coupling device showing the coupling members in partially engaged but noncoupled positions.

To releases the coupling members it is only necessary to reverse motors 72 to cause latching collar to be unscrewed from flange 50 and to return to the position shown in FIG. 1 in which expander ring 62 is retracted relative to latching dogs 44, freeing the latter for radial outward movement sufficient to permit their retraction from groove 22. Thereupon, it is only necessary to lift stack S and its appended box member 12 sufficiently to clear stem 14 and to complete the separation of the coupling members.

Various changes and modifications may be made in the details of the illustrative embodiment within the scope of the appended claims without departing from the spirit of this invention.

1. A powered coupling device, comprising;
   a. a tubular box member having a cylindrical socket terminating in a conically tapered seat at its inner end;
   b. a tubular pin member slidably receivable in said box member and having a conically tapered end face abuttable against said seat;
   c. an annular latching groove in the exterior of said pin member spaced from said end face;
   d. latching dogs mounted to the outer end of said socket for radial movement into and out of latching engagement with said latching groove;
   e. a latching collar surrounding said latching dogs and having threaded connection to the exterior of said socket for longitudinal movement relative thereto in response to rotation of said collar relative to the socket;
   f. wedge means carried by said collar cooperating with said latching dogs to urge the latter radially inwardly in response to relative upward movement of said collar and to release said latching dogs for outward radial movement in response to relative downward movement of said latching collar;
   g. fluid pressure-operated power means mounted on said box member; and
   h. rotary drive means connecting said power means to said latching collar.

2. A powered coupling device according to claim 1 including an annular plastic seal element disposed in said box member for sealing about said pin member.

3. A powered coupling device according to claim 1 including means for mounting said latching dogs to the outer end of said socket comprising oppositely extending overlapping lip elements on said dogs and said outer end of said socket.

4. A powered coupling device according to claim 1 wherein said wedge means includes a ring mounted for relative rotation in said collar and having a wedging surface for engaging said latching dogs.

5. A powered coupling device according to claim 4 having antifriction bearing means disposed between said ring and said collar.

6. A powered coupling device according to claim 1 wherein said rotary drive means includes:
   a. spur gears driven by said power means; and
   b. an internally toothed ring gear mounted on said latching collar for rotation about an axis parallel to those of said spur gears and having its teeth in longitudinally slidable meshing engagement with the teeth of said spur gears.